United States Patent [19]

Davies, Jr.

[11] 3,740,660

[45] June 19, 1973

[54] MULTIPLE PHASE CLOCK GENERATOR CIRCUIT WITH CONTROL CIRCUIT

[75] Inventor: Thomas J. Davies, Jr., Anaheim, Calif.

[73] Assignee: North American Rockwell Corporation, El Segundo, Calif.

[22] Filed: May 27, 1971

[21] Appl. No.: 147,555

[52] U.S. Cl. .............. 331/45, 307/221 C, 307/251, 307/262, 328/57, 328/62, 331/60, 331/111, 331/135

[51] Int. Cl. .... H03b 5/20, H03b 19/12, H03k 23/08

[58] Field of Search ........... 331/45, 60, 61, 108 D, 331/111, 135; 307/262; 328/57, 62, 24; 307/221 R, 221 C; 321/5

[56] References Cited

UNITED STATES PATENTS

| | | | |
|---|---|---|---|
| 3,241,033 | 3/1966 | Peaslee et al. | 321/5 |
| 3,596,188 | 7/1971 | Haase | 331/45 X |

*Primary Examiner*—Roy Lake
*Assistant Examiner*—Siegfried H. Grimm
*Attorney*—L. Lee Humphries and H. Frederick Hamann

[57] ABSTRACT

A clock signal generating circuit including an oscillator circuit for supplying complementary square wave signals. A control circuit connected to the oscillator circuit for receiving the square wave signals and for, providing phase inversion and ordering of the signals in order to prevent phase overlap between the complementary signals. The output signals from the control circuit provide gating signals for a shift register. Output signals from the shift register are provided as input signals to output logic gates for generating multiple phase output signals. The output logic gates receive feedback signals from certain of the output logic gates for synchronizing the phase relationship between the multiple phase clock signals produced by the output logic gates.

11 Claims, 7 Drawing Figures

INVENTOR
THOMAS J. DAVIES, JR.
BY Robert G. Rogers
ATTORNEY

INVENTOR
THOMAS J. DAVIES, JR.
BY Robert G. Rogers
ATTORNEY

INVENTOR
THOMAS J. DAVIES, JR.
BY Robert G. Rogers
ATTORNEY

INVENTOR
THOMAS J. DAVIES, JR.
BY Robert G. Rogers
ATTORNEY

INVENTOR
THOMAS J. DAVIES, JR.
BY Robert G. Rogers
ATTORNEY

| B' | A' | E | F | D | C | $\phi_{1+2}$ | $\phi_{3+4}$ | $\phi_1$ | $\phi_3$ |
|---|---|---|---|---|---|---|---|---|---|
| 0 | 1 | 1 | 0 | 0 | 1 | 1 | 0 | 0 | 0 |
| 1 | 0 | | | | | | | | |
| 0 | 1 | 0 | 1 | 0 | 1 | 0 | 1 | 0 | 1 |
| 1 | 0 | | | | | | | | |
| 0 | 1 | 0 | 1 | 1 | 0 | 0 | 1 | 0 | 0 |
| 1 | 0 | | | | | | | | |
| 0 | 1 | 1 | 0 | 1 | 0 | 1 | 0 | 1 | 0 |
| 1 | 0 | | | | | | | | |
| 0 | 1 | 1 | 0 | 0 | 1 | 1 | 0 | 0 | 0 |
| 1 | 0 | | | | | | | | |
| 0 | 1 | 0 | 1 | 0 | 1 | 0 | 1 | 0 | 1 |
| 1 | 0 | | | | | | | | |
| 0 | 1 | 0 | 1 | 1 | 0 | 0 | 1 | 0 | 0 |
| 1 | 0 | | | | | | | | |
| 0 | 1 | 1 | 0 | 1 | 0 | 1 | 0 | 1 | 0 |
| 1 | 0 | | | | | | | | |
| 0 | 1 | 1 | 0 | 0 | 1 | 1 | 0 | 0 | 0 |
| 1 | 0 | | | | | | | | |
| 0 | 1 | 0 | 1 | 0 | 1 | 0 | 1 | 0 | 1 |

TABLE II

INVENTOR
THOMAS J. DAVIES, JR.
BY Robert G. Rogers
ATTORNEY

INVENTOR
THOMAS J. DAVIES, JR.
BY Robert G. Rogers
ATTORNEY

MULTIPLE PHASE CLOCK GENERATOR CIRCUIT WITH CONTROL CIRCUIT

BACKGROUND OF THE INVENTION

1. Field of the Invention

The invention relates to a multiple phase clock signal generator circuit using a control circuit and more particularly to such a generator circuit in which the control circuit orders the phase relationship between square wave signals generated by an RC oscillator circuit in order to prevent phase overlap between the square wave signals.

2. Description of Prior Art

One prior art multiple phase clock signal generator requires a sixteen bit ring counter to generate the signals required to produce multiple phase clock signals having the desired phase relationship. In addition, an oscillator for such counter using field effect transistors may use an external resistor with an internal (on the chip) field effect transistor utilized as a resistor in a voltage divider network. It has been found that such an oscillator circuit is susceptible to temperature variations. As a result, the external resistor must be precisely selected to give the proper operating frequency.

Examples of prior art multiple phase clock signal generators can be found by referring to U.S. Pat. No. 3,350,659 to W. Henn for a Logic Gate Oscillator, issued Oct. 31, 1967, (Cl 331–57), U.S. Pat. NO. 3,382,455, to A. K. Rapp for A Logic Gate Pulse Generator, issued May 7, 1968 (Cl 331–111), and U.S. Pat. No. 3,539,938 to Gary L. Heimbigner for Multiple Phase Clock Signal Generator, issued Nov. 10, 1970 (Cl 331–57).

It has been seen however that square wave signals generated by the oscillator for gating purposes, often overlap in phase, i.e. both may be true or false at the same time. The overlap is usually due to poor rise and fall times caused by inherent circuit limitations. During the overlap period, a shift register being gated by the signals would be permitted to run free. When a shift register runs free, a phase time may be skipped so that any multiple phase output signal could be reduced by a period equivalent to one phase time. Ordinarily, one phase time is equivalent to the period of one of the oscillator signals e.g., the true period of an oscillator signal.

Therefore, in order to provide a multiple phase clock generator circuit which overcomes the problem of phase skipping i.e., free running, a control circuit must be interposed between the oscillator circuit and the shift register circuit. As will be described in more detail subsequently, such a control circuit may be used to invert the phase relationship between the square wave oscillator signals to order the phase relationship between signals so that phase overlap does not occur.

SUMMARY OF THE INVENTION

Briefly, the invention comprises a multiple phase clock signal generator using an RC oscillator network in combination with a plurality of inverters for generating square wave output signals forming the basic frequency unit for the multiple phase output signals. A pulsed input signal may be used in lieu of the RC network where external synchronizing action is desired.

A control circuit phase inverts and reorders the square wave signals so that the signal has a distinct true and false interval without overlapping the true and false interval of another signal. As a result, a circuit being gated by the output signals from the control circuit is gated precisely and is not enabled to run free i.e., skip phases.

A multi-bit shift register receives the phase ordered square wave signals from the control circuit and provides output signals from each position of the shift register to output logic gates. The multiple output signals are also inverted to provide signals to other input logic gates.

The output logic gates generate multiple phase clock signals. Certain of the clock signals are fedback as inputs to the output logic gate for synchronizing the phase relationship between the multiple phase output signals.

OBJECTS AND ADVANTAGES

Therefore, it is an object of this invention to provide an improved multiple phase clock signal generator utilizing a control circuit to produce gating signals having the proper phase relationship.

Another object of this invention is to provide an improved multiple phase clock signal generator using an RC network as part of an oscillator circuit, a control circuit for ordering the phase relationship between square wave signals generated by the oscillator circuit, and a multi-bit shift register responsive to the phase ordered square wave signals for providing output signals to logic gates generating the multiple phase clock signals.

A still further object of this invention is to provide a multiple phase clock signal generator in which the gating signals are phase ordered by a control circuit to prevent a free running condition from occurring in a multibit shift register gated by the square wave signals.

These and other objects of this invention will become more apparent when the following description is read in conjunction with the attached drawings:

DESCRIPTION OF PREFERRED EMBODIMENT

Figure 1:
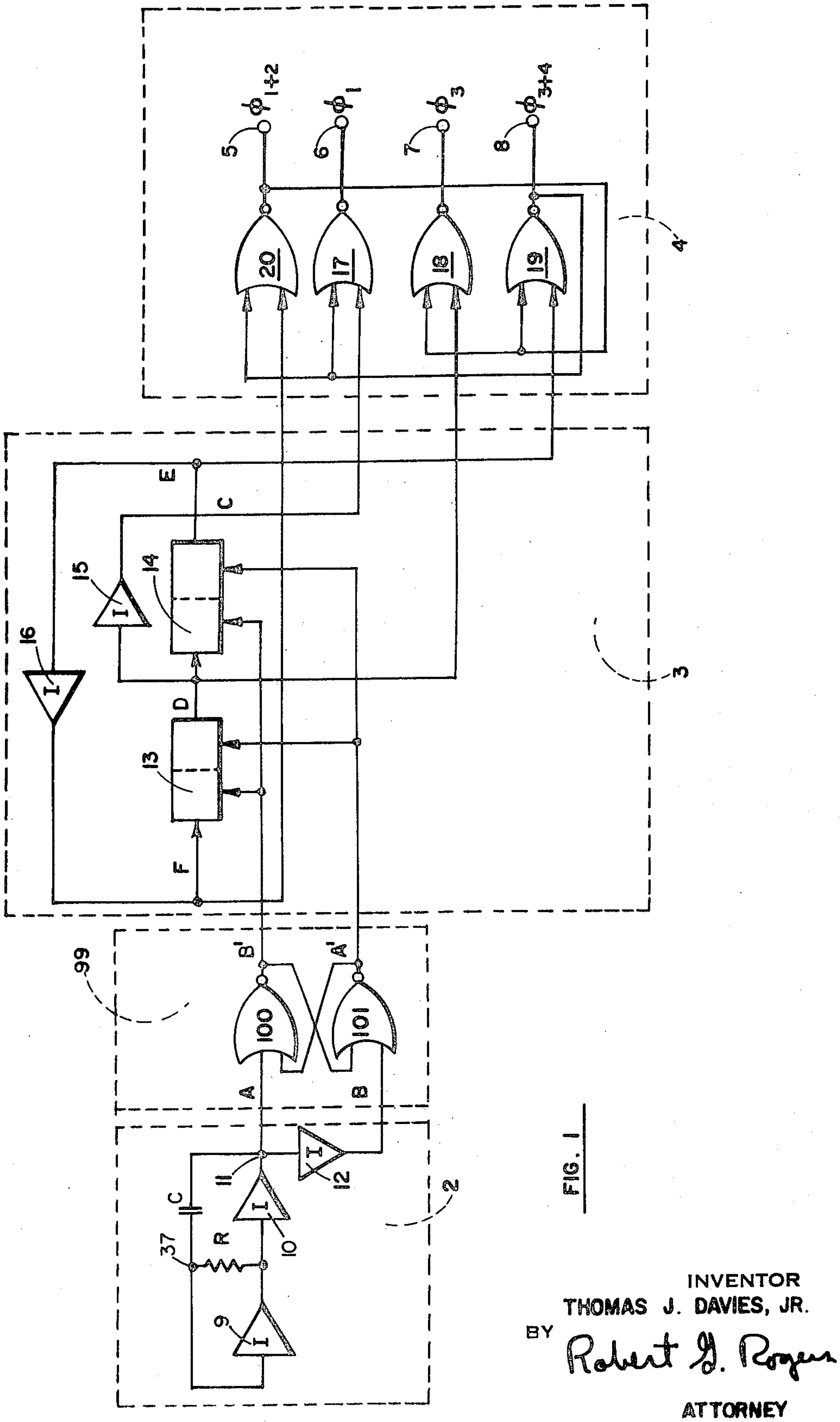
FIG. 1 is a block diagram of the multiple phase clock signal generator.

FIG. 1 is a block diagram of one embodiment of a multiphase clock signal generator including an oscillator circuit 2, a multi-bit shift register circuit 3, an output logic gating circuit 4 and a control circuit 99. The oscillator circuit 2 includes inverters 9, 10 and 12 connected in series with the output of inverter 9 connected to the input of inverter 10 and the output of inverter 10 connected to the input of inverter 12. Resistor R is connected from the output to the input of inverter 9. Capacitor C is connected between the output of inverter 10 and the input of inverter 9. The output terminals of inverters 10 and 12 are connected as the output terminals of oscillator 2.

The output terminals of oscillator 2 are connected as input terminals of control circuit 99. In particular, the output terminal of inverter 10 (common circuit point 11) is connected to one input terminal of NOR gate 100. The output terminal of inverter 12 is connected to one input terminal of NOR gate 101. The output terminal of NOR gate 101 is connected to another input terminal of NOR gate 100. The output terminal of NOR gate 100 is connected to another input of NOR gate 101. Thus, NOR gates 100 and 101 represent a latching type circuit wherein the output signals B′ and A′ from gates 100 and 101 respectively are mutually exclusive.

Figure 5:
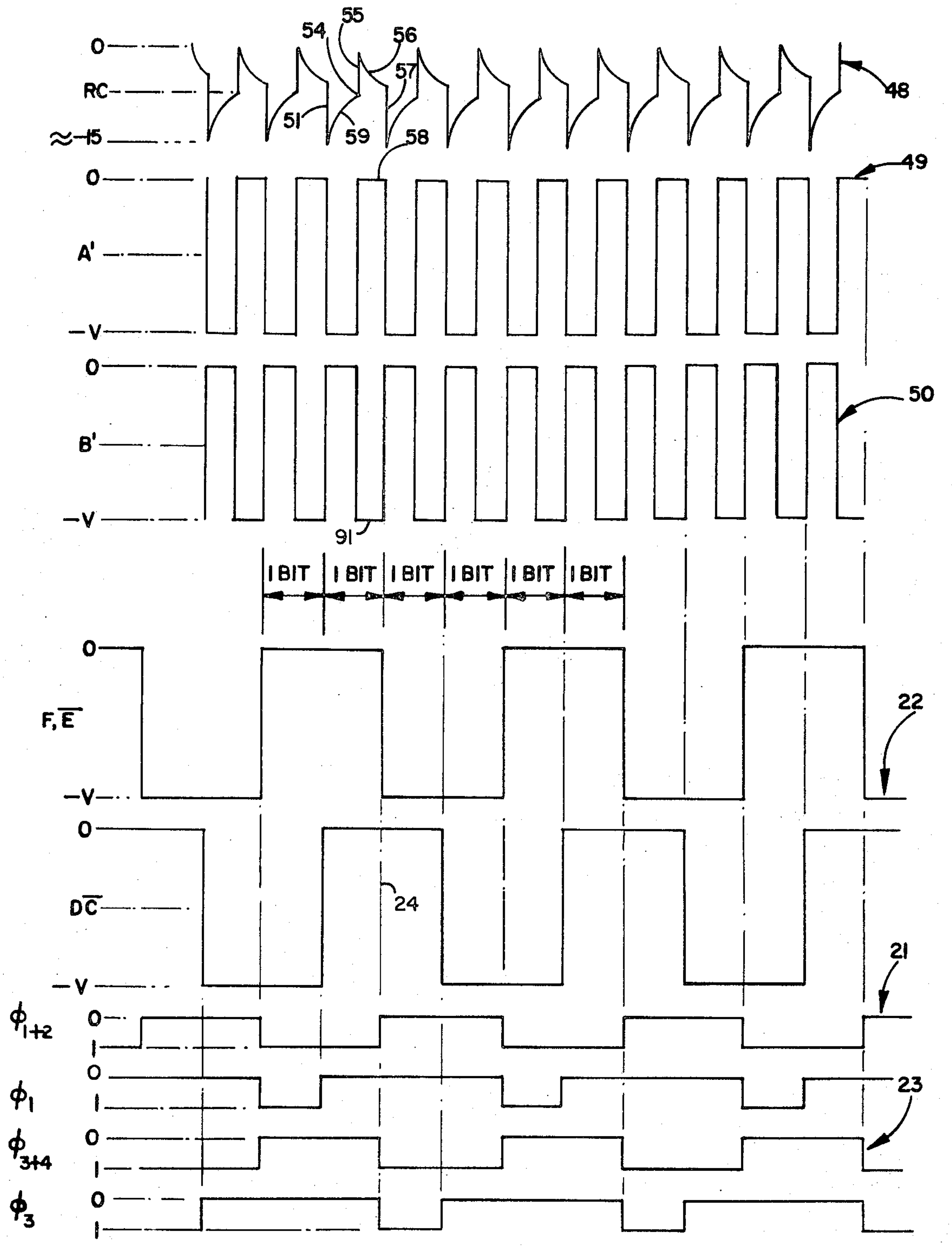
FIG. 5 is a diagram of signal waveforms detected at various points in the diagram shown in FIG. 1.
Figure 7:
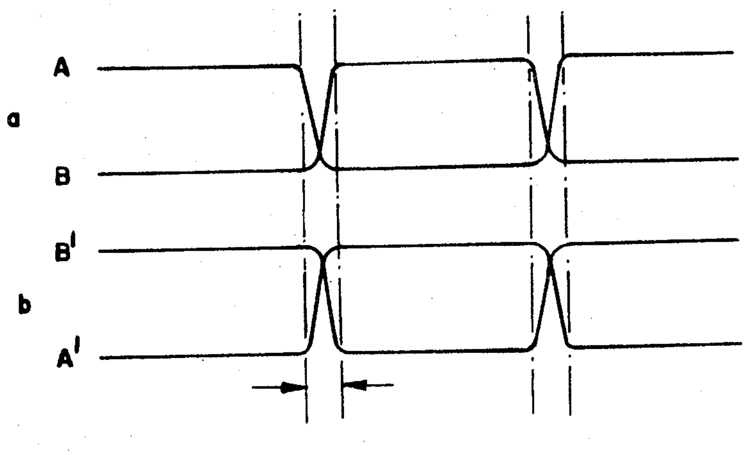
FIG. 7 (lines *a* and *b*) is a diagram of the substantially square wave signals at the output of the oscillator circuit of the clock signal generator and the reordered square wave signals at the output of the control circuit of the multiple phase clock signal generator, respectively.

The operation of oscillator circuit 2 is well known in the art. Briefly, the signal at the input of input terminal of inverter 9 is inverted thereby and produced as the complement signal at the output terminal of inverter 9. The inverted signal is supplied to the input terminal of inverter 10 which operates thereupon and produces an inverted output signal which is substantially similar to the input signal at the input terminal of inverter 9. However, the RC network is continually charging and discharging in accordance with the RC time constant thereof whereby the signal at the input terminal of inverter 9 is continually changing in level whereby a substantially alternating signal (see line RC of FIG. 5) is produced. This signal, applied at the input of inverter 9, effectively causes an output signal at terminal 11 which is alternating in nature. Inverter 12 causes signal B (the complement of signal A) to be produced. Thus, oscillator circuit 2 provides output signals A and B as inputs to the control circuit 99. Control circuit 99 is a circuit, known in the art, which operates on the input signals A and B to produce the inverted output signals B′ and A′, respectively, as described hereinafter. The A and B signals, as well as the A′ and B′ signals are opposite in phase as shown in FIGS. 5 and 7. (However, signals A′ and B′ are shown only in FIG. 5) The A′ and B′ signals of FIG. 5 are assumed to have the proper phase relationship as shown in FIG. *7b*.

Shift register 3 shown in FIG. 1 includes two bit positions or shift register cells 13 and 14 connected in series. Each of shift register cells 13 and 14 provides two outputs. In particular, each of shift register cells 13 and 14 includes an input terminal connected to the output terminal of NOR gate 100 to receive the B′ signal therefrom. In addition, each of the shift register cells 13 and 14 has an input terminal connected to the output of NOR gate 101 to receive the signal A′. The output terminal of shift register cell 13 is connected to an input terminal of shift register cell 14 and to the input terminal of inverter 15. Signal D is supplied at the output terminal of shift register cell 13. The output of shift register cell 14 is connected to the input terminal of inverter 16 and to an input terminal of NOR gate 19 in gating circuit 4. The signal E is supplied along those lines. The output terminal of inverter 16 is connected to the data or information input terminal of shift register cell 13 as well as to an input terminal of NOR gate 20 in gating circuit 4. The signal F is supplied along these lines. The output terminal of inverter 15 is connected to an input terminal of NOR gate 17 of gating circuit 4. The signal C is supplied along this line. Since the present embodiment generates four phase output signals, only a two bit shift register is required. Of course, other types of shift registers may be utilized. If eight phases were required, a four bit shift register might be necessary. The B′ signal is used to gate information into a position and the A′ signal gates the information out.

The control circuit 99 comprises two NOR gates 100 and 101 which receive A and B square wave oscillator signals from the oscillator circuit 2 and provide phase inverted and ordered square wave oscillator signals A′ and B′ to bit positions 13 and 14 of the two bit shift register 3. The effect of control circuit 99 is to produce output signals A′and B′in an exclusive OR fashion.

The relationship between the A and B signals and the A′, B′ signals can be seen by referring to FIG. 7. FIG. *7a* illustrates an extreme case wherein both the A and B signals are true at the same time. That is inerherent circuit limitations can cause relatively slow rise and fall times for the A and B signals. As a result, the A and B signals can assume the same level simultaneously. When both signals are true at the same time (in the absence of control circuit 99), it is possible to gate signals into and gate out of the two bit shift register 3 simultaneously such that a phase time is skipped and the phase of the output signals may be shifted or shortened by one phase interval. A phase interval is defined to be equivalent to the true period of one of the square wave signals.

Control circuit 99 however inverts the A and B signals and produces the output signals A′ and B′. Control circuit 99 utilizes feedback connections from the outputs of the NOR gates 100 and 101 to inputs of gates 101 and 100, respectively, to order (i.e., synchronize), the signals A′ and B′ as shown in FIG. *7b* so that it is impossible for the input signals supplied to shift register 3 to be true at the same time. The following equations illustrate the relationship between the A, B, A′ and B′ signals.

$$A' = \overline{(B + B')}$$
$$B' = \overline{(A + A')}$$

The following Truth Table also illustrates the relationship between the two sets of signals.

TABLE I

| *A* | *B* | *B′* | *A′* |
|---|---|---|---|
| 0 | 1 | 1 | 0 |
| 1 | 0 | 0 | 1 |
| 1 | 1 | 0 | 0 |
| 0 | 0 | HOld | State |

Shift register 3 operates on the signal A′ and B′ to generate the four output signals C, D, E, and F. The D and E signals are inverted by inverters 15 and 16 to form the C and F signals respectively.

The C, D, E, and F signals are supplied to NOR gates 17, 18, 19 and 20 included in logic gating circuit 4; NOR gates 17–20 provide a true, i.e., logic 1, output signal when signals at both input terminals are false. The other input signals to the NOR gates 17–20 received from the output terminals 5, 6, 7, and 8 and represent phase clock signals $\phi_{1+2}$, $\phi_1$, $\phi_3$, and $\phi_{3+4}$ respectively. Feedback is utilized to sychronize the phase relationship between the various four phase signals being generated, For example, since gate 20, which produces clock signal $\phi_{1+2}$ receives $\phi_{3+4}$ and F as input signals, clock signal $\phi_{1+2}$ cannot become true until both input signals to gate 20 are false. As a result, it is impossible for a phase overlap to exist between the $\phi_{3+4}$ and the $\phi_{1+2}$ clock signals.

In operation inverter 9 produces an output signal (e.g., positive) which is applied to inverter 10 and by which capacitor C is charged through resistor R to provide an input signal (e.g., positive going) to inverter 9. Inverter 10 inverts the signal supplied thereto and produces negative signal A and circuit point 11. When the proper threshold signal level has been reached at capacitor C, inverter 9 is effectively "triggered" and an invalid or negative output signal which is supplied to the input terminal of inverter 10 which now generates the inverted (positive) signal A at point 11. The stored charge on C then begins to discharge through resistor R and inverter 9 so that the signal level at the input terminal of inverter 9 changes. Again, when the input signal at inverter 9 (across capacitor C) reaches the threshold level (e.g., negative going), inverter 9 is "triggered" and provides a positive output signal. This operation continues on a substantially free running basis with the pulse period defined by the RC time constant. This operation suggested by the waveform RC of FIG. 5.

The signal A at point 11 is supplied to and inverted by inverter 12 to provide signal B. Signals A and B are the output signals of oscillator 2 and are best seen at FIG. 7*a*. The signals are inverted and phase ordered by control circuit 99 to provide the A' and B' signals as seen in FIG. 7*b*. These signals are supplied to shift register 3.

As an alternate embodiment, the RC network can be switched out of the circuit so that the square wave signals are generated in response to a pulsed input. The switches are omitted for convenience.

Whenever signal B' is true, logic information represented by signals F and D is shifted into bit positions 13 and 14 of the two bit shift register 3. When signal B' becomes false, signal A' becomes true and the information previously shifted, or loaded into flip flops 13 and 14, during signal B' is shifted out as signals D and E from bit positions 13 and 14, respectively. The signals D and E are inverted by inverters 15 and 16 respectively to provide inputs to the bit positions 13 and 14.

The C, D, E, and F signals are provided as input signals to input terminals of NOR gates 17, 18, 19 and 20 respectively. In addition, NOR gates 17 and 20 receive the $\phi_{3+4}$ clock signal from output terminal 8 at the output of gate 19. The $\phi_{1+2}$ clock signal is supplied from terminal 5 at the output of gate 20 to provide input signals to NOR gates 18 and 19.

The following table illustrates the logic for the multiple phase clock signals $\phi_1$, $\phi_3$, $\phi_{1+2}$ and $\phi_{3+4}$ provided at output terminals 5 through 8.

Table II $$\phi_{1+2} = \overline{F} \cdot \overline{\phi_{3+4}}$$
$$\phi_{3+4} = \overline{E} \cdot \overline{\phi_{1+2}}$$
$$\phi_1 = \overline{\phi_{3+4}} \cdot \overline{C}$$
$$\phi_3 = \overline{\phi_{1+2}} \cdot \overline{D}$$

As shown in FIG. 5, the period of oscillation for each of the signals *C* through *F* is four times the period of oscillation for the oscillator square wave output signals A' and B'. Each cycle of the signals A' and B' represents one phase (e.g., $\phi_1$, $\phi_3$ etc.) of a multiple phase output signal.

Signal $\phi_{1+2}$ is true (i.e., level 1) as shown in FIG. 5 when the *F* signal is false (i.e., level 0) and the $\phi_{3+4}$ signal is concurrently false (i.e. level 0). Dashed line 24 illustrates that $\phi_{1+2}$ becomes false (i.e., level 0) at the trailing (i.e., negative going) edges of the F and the $\phi_{3+4}$ signals. A similar comparison can be made for each of the multiple phase clock signals.

Figure 6:
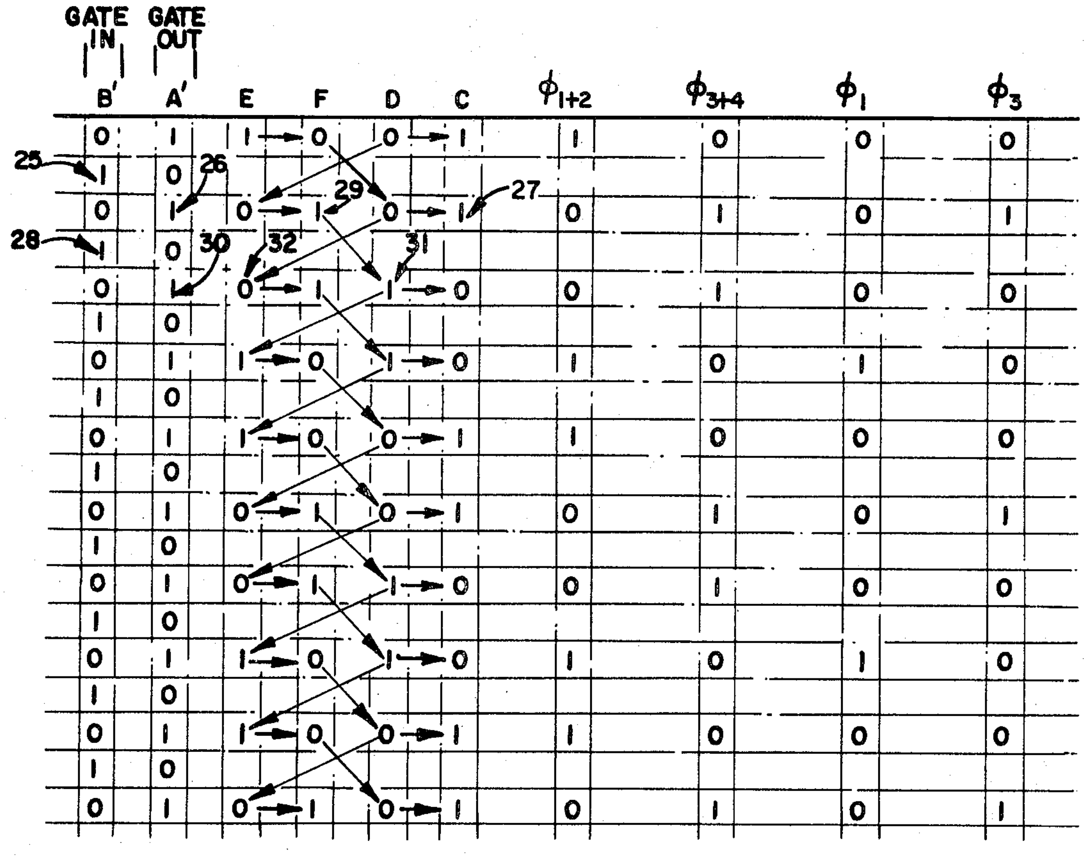
FIG. 6 is a Truth Table illustrating the gating effect of the shift register shown in FIG. 3.

The Truth Table shown in FIG. 6 illustrates the gating effects of the control circuit signals A' and B'. The arrows indicate the shift of the information represented by signals F and D in and out of the bit positions represented by shift register cells 13 and 14 of the multi-bit shift register 3. When A' is true (i.e., level one) the F and D signals are gated into shift register cells 13 and 14 respectively. Conversely, when signal B' is true, the D and E signals are gated out of shift register cells 13 and 14 respectively. Of course, the A' and B' signals are mutually exclusively applied due to the operation of control circuit 99 as described supra.

As illustrated in the Truth Table of FIG. 6, when F is false (i.e., at level 0) and B' is true (i.e. level 1), designated by numeral 25, the false state of F is loaded into bit position 13 of the two bit shift register. Thereafter, when A' becomes true, designated by numeral 26, the false state of F is shifted out of bit position 13 as signal D having the same false state. Signal D is then inverted by inverter 15 to become signal C, designated by numeral 27. Similarly, the D information is loaded into bit position 14 when B' is true designated by numeral 28. AT the same time, the F information designated by numeral 29 is being loaded into bit position 13. When the A' signal becomes true during the next cycle, numeral 30, the F and D signals are shifted from the bit positions 13 and 14 as D and E signals numerals 31 and 32 respectively. Other examples can be given but it is not believed necessary.

The phase relationship between the multiple phase clock signals is also shown in Table II. The logic 1 designations represent the true state of the multiphase clock signals and the logic 0 bits represent the false state of the multiple phase clock signals. As indicated above, a single bit of information is equivalent to one cycle of the basic square wave signals A' and B' as shown in FIG. 5.

Figure 2:
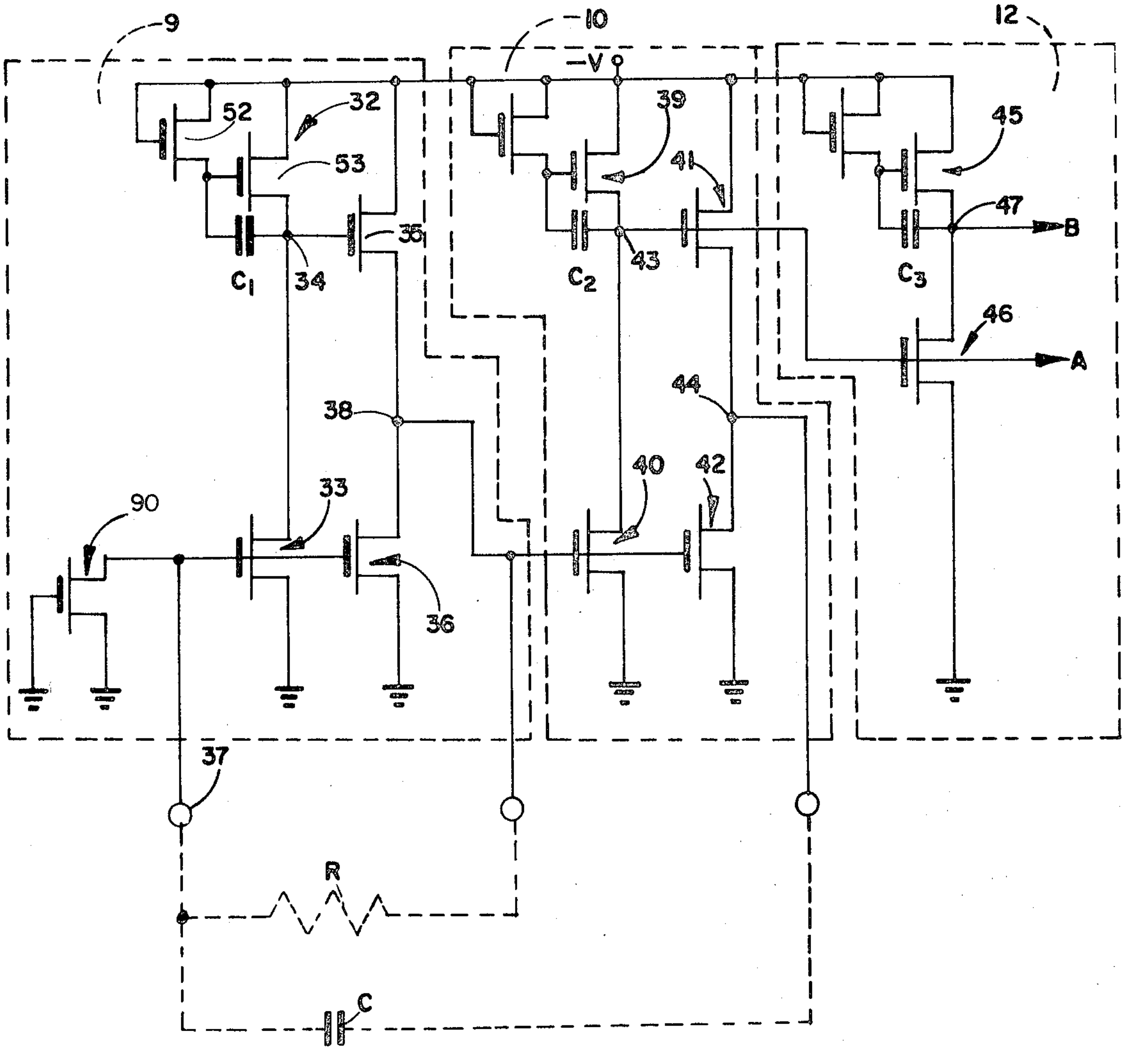
FIG. 2 is a schematic diagram of the oscillator circuit shown in FIG. 1 implemented by field effect transistors.

FIG. 2 is a schematic diagram of one embodiment of the oscillator circuit 2 shown in FIG. 1. Inverter 9 includes bootstrap circuit 32 connected in series with the conduction path of inverter field effect transistor 33 between −V and electrical ground. Bootstrap circuit 32 includes field effect transistor 52 which has the gate and source electrodes thereof connected to source −V and the drain electrode connected to the gate electrode of field effect transistor 53. The conduction path (i.e., source to drain) of field effect transistor 53 is connected between source −V and common point 34. The gate electrode of field effect transistor 35 and the source electrode of field effect transistor 33 are connected at common point 34. Capacitor $C_1$ (which may be inherent capacitance) is connected between the gate and drain electrode of field effect transistor 34. The output signal produced from point 34 between the bootstrap circuit 32 and inverter field effect transistor 33 is provided as an input signal to field effect transistor 35 comprising one half of a push-pull output stage of inverter 9. The push-pull output stage is required in order to provide sufficient drive for the next stage. The other half of the push-pull output stage is provided by field effect transistor 36 which is connected to receive a signal on its gate electrode fromthe RC common connection point 37 which is the input terminal of inverter 9. The gate electrode of field effect transistor 33 is also connected to common point 37. The output from inverter 9 is produced at common point (output terminal of inverter 9) 38 between field effect transistors 35 and 36. The resistor R is connected between common point 37 and common point 38.

Inverter 10 has the same circuit configuration as inverter 9 and includes bootstrap circuit 39 connected in series with an inverter field effect transistor 40. The push-pull output stage of inverter 10 comprises field effect transistors 41 and 42 connected in electrical series between −V and electrical ground. The gate electrodes of field effect transistors 40 and 42 are connected together and operate as the input terminal for inverter 10 and, thereby, receive an input signal from the output terminal 38 of inverter 9. The gate electrode of field effect transistor 41 is connected to common point 43 between bootstrap circuit 39 and inverter field effect transistor 40.

The signal A is obtained at common point 43. Capacitor C is connected from output terminal 44 of the push-pull stage of inverter 10 between field effect transistors 41 and 42 to input terminal 37 of inverter 9.

Inverter 12 is similar to inverters 9 and 10 without the push-pull output stage. The push-pull output stage is not required in inverter 12 since the output signal from inverter 12 does not drive the next stage. However, inverter 12 includes bootstrap circuit 45 connected in electrical series with inverter field effect transistor 46 between −V and electrical ground. The gate electrode of field effect transistor 46 is connected to common point 43 such that signal A from inverter 10, provides an input signal to the gate electrode of field effect transistor 46. Therefore, when signal A is true, field effect transistor 46 is conductive and output, terminal 47 of inverter 12 is connected to electrical ground. Since signal B is taken from point 47, signals A and B have the opposite phase relationship.

The operation of the FIG. 2 circuit can best be understood by referring to signals 48, 49 and 50 shown in FIG. 5. However since signals 49 and 50 are the A′ and the B′ signals from the control circuit, for purposes of this description, the signals shown must be reversed in phase. Otherwise, the operation is the same.

Initially, assume that field effect transistors 33 and 36 are off. As a result, point 38 is driven to approximately −V (less one threshold voltage) by the action of bootstrap circuit 32 which provides a −V voltage level on the gate electrode of field effect transistor 35. The voltage at circuit point 38 turns field effect transistors 40 and 42 on thereby connecting points 43 and 44 to electrical ground. It should be noted that circuit point 44 is similar to circuit point 11 in FIG. 1. As a result, capacitor C is charged through resistor R by the voltage level difference between points 38 and 44. The RC signal 48 at point 37 is charged towards a negative voltage level as indicated by the portion of the signal designated by numeral 51. Field effect transistor 90 acts as a protective device and becomes conductive for clamping point 37 to a safe positive voltage level.

As soon as the voltage at point 37 is in excess of the threshold voltage levels for field effect transistors 33 and 36, the transistors become conductive thereby connecting point 38 to electrical ground through field effect transistor 36. When the field effect transistors 33 and 36 become conductive, field effect transistors 40 and 42 are turned off and point 44 is driven to approximately −V through field effect transistor 41. Since the voltage across capacitor C cannot charge instantaneously, point 37 then becomes more negative by capacitor action as indicated by portion 51 of the signal. Simultaneously, the A signal taken from point 43 is driven to approximately −V through the bootstrap circuit 39. Since field effect transistor 46 is turned on by the application of the true level of signal 49 to its gate electrode, the B signal taken from point 47 is driven to electrical ground.

When point 34 is connected to electrical ground, capacitor C1 is charged to a voltage level one threshold less than −V through field effect transistor 52. Thereafter the field effect transistor 52 is turned off. During the next cycle when field effect transistor 33 is turned off, point 34 changes from approximately electrical ground to approximately −V. The change in the voltage level is fed back across capacitor C1 to the gate electrode of field effect transistor 53 comprising the bootstrap circuit 32. The feedback voltage substantially enhances the conduction of field effect transistor 53 to drive point 34 to substantially the −V voltage level. The increase in the voltage level at point 34 enables field effect transistor 35 to provide an output voltage at point 38 equal to −V reduced by a single threshold drop across field effect transistor 35. The other bootstrap circuits operate in substantially the same manner.

When field effect transistors 33 and 36 were turned on, point 38 was connected through field effect transistor 36 to electrical ground. As a result, the charge across capacitor C is discharged towards electrical ground as indicated by the portion of signal 48 designated by numeral 59. The capacitor discharges until the voltage at point 37 is less than the threshold voltage level required to maintain the conduction of field effect transistors 33 and 36. When that occurs as indicated by numeral 54, field effect transistors 33 and 36 are turned off and field effect transistors 40 and 42 are turned on. The voltage at point 44 changes from a negative voltage to electrical ground. The change in the voltage at point 44 is immediately transferred to point 37 by capacitor action. The change at point 37 is indicated by the rapid change in signal 48 designated by numeral 55. The voltage at point 37 is prevented from going more positive than electrical ground since the junction of field effect transistor 90 becomes conductive to clamp point 37 to approximately electrical ground.

Capacitor C then begins to charge so that the voltage at point 37 is reduced as a function of the RC time constant, i.e., the voltage at point 37 becomes more negative as capacitor C is charged to the difference between the voltage levels at point 38 and at point 44. The charging action is designated by numeral 56 for signal 48 as shown in FIG. 5. Whenever the threshold voltage levels of field effect transistor 33 and 36 have been overcome, the field effect transistors are turned on and point 38 is changed from a negative voltage to approximately electrical ground. Simultaneously, point 44 is changed from electrical ground to a negative voltage. The change in the voltage at point 44 is immediately reflected at point 37 by rapid change in the voltage level at point 37 from slightly in excess of the threshold voltage for transistors 33 and 36 to a substantially more negative voltage. The change is designated by numeral 57 on signal 48 as shown in FIG. 5. Thereafter, capacitor C charges through resistor R in the opposite direction as in the previous cycle.

It is pointed out that when the field effect transistors 40 and 42 became conductive as designated by the numeral 55 for signal 48 in FIG. 5, field effect transistor 46 was turned off. As a result at point 47, signal B (shown in FIG. 5 and B'), became more negative and a point 43 signal A (shown in FIG. 5 as A') was driven to electrical ground. Numerals 58 and 91 identify the portions of the A and B signals (should reverse phases as previously noted) involved at that particular time.

Figure 3:
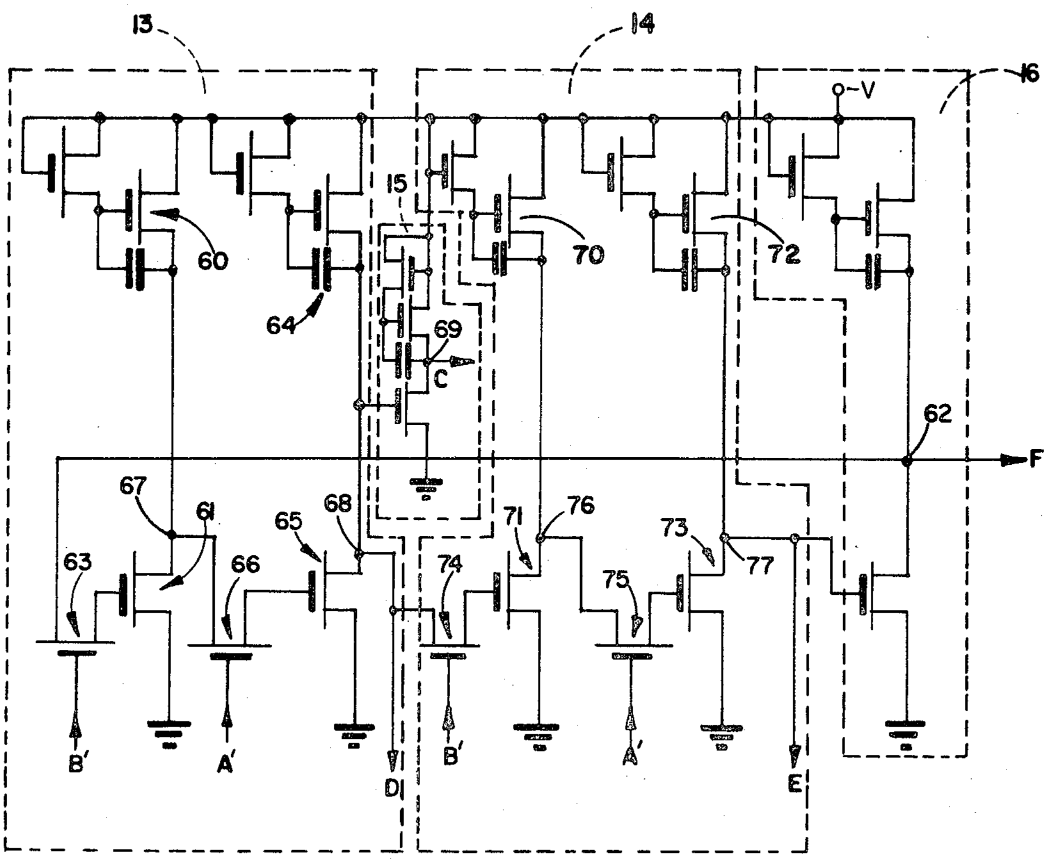
FIG. 3 is a schematic diagram of the multi-bit shift register shown in FIG. 1 implemented by field effect transistors.

FIG. 3 is a schematic diagram of the two bit shift register shown in FIG. 1. Inverters 15 and 16 each comprise substantially the same circuit as shown and described in connection with FIG. 2 for inverters 9 and 10 with the exception that the inverters 15 and 16 do not utilize a push-pull output stage. In other words, inverters 15 and 16 are similar to inverter 12 shown in FIG. 2. For that reason, a detailed circuit description of inverter 15 and 16 is not given for the inverters in FIG. 3. Bit positions (or shift register cells) 13 and 14 both comprise substantially the same circuit configuration. The inputs and outputs are different as described previously.

Bit position 13 is divided into two stages, each representing one half of the bit position. Both stages have identical circuitry. The first stage of the bit position or cell includes bootstrap circuit 60 connected in series with inverter field effect transistor 61 between −V and electrical ground. The F signal taken from point 62 is selectively gated into bit position 13 by field effect transistor 63. Field effect transistor 63 is gated by oscillator signal B'.

The second stage of the bit position 13 includes portion circuit 64 connected in electrical series with inverter field effect transistor 65 between source −V and electrical ground. Field effect transistor 66 connected between the output terminal 67 of the first stage and the input terminal of the second stage, viz., the gate electrode of field effect transistor 65. That is, the signal at point 67 is gated into the second stage when the A signal applied to the gate electrode of field effect transistor 66 is true. In effect, the F signal at point 62 (i.e., output terminal of inverter 16) is sampled and gated into the bit position 13 during a true pention of signal B' and the signal at point 67 is sampled and gated out of the bit position 13 at point 68 during the true portion of signal A'. The signal at point 68 is designated as signal D. This signal is also inverted through inverter 15 and is provided as signal C at point 69.

Bit position 14 is similarly comprised of two half bit stages. The first half bit stage of bit position 14 includes bootstrap circuit 70 and field effect transistor inverter circuit 71 connected between −V and electrical ground. The second half bit stage comprises bootstrap circuit 72 connected in electrical series with inverter field effect transistor 73 connected between source −V and electrical ground. The D signal at point 68 (i.e., output terminal of bit position 13) is gated into bit position 14 during a true signal B' which is applied to the gate electrode of sampling field effect transistor 74. Similarly, the output from first half bit stage is gated into the output stage of bit position 14 during a true signal A' which is applied to the gate electrode of sampling field effect transistor 75. The output signal from the input half of the bit position 14 is taken from circuit point 76. The output signal E is obtained from the bit position 14 at circuit point 77 and inverted by inverter 16 to generate signal F at point 62.

Figure 4:
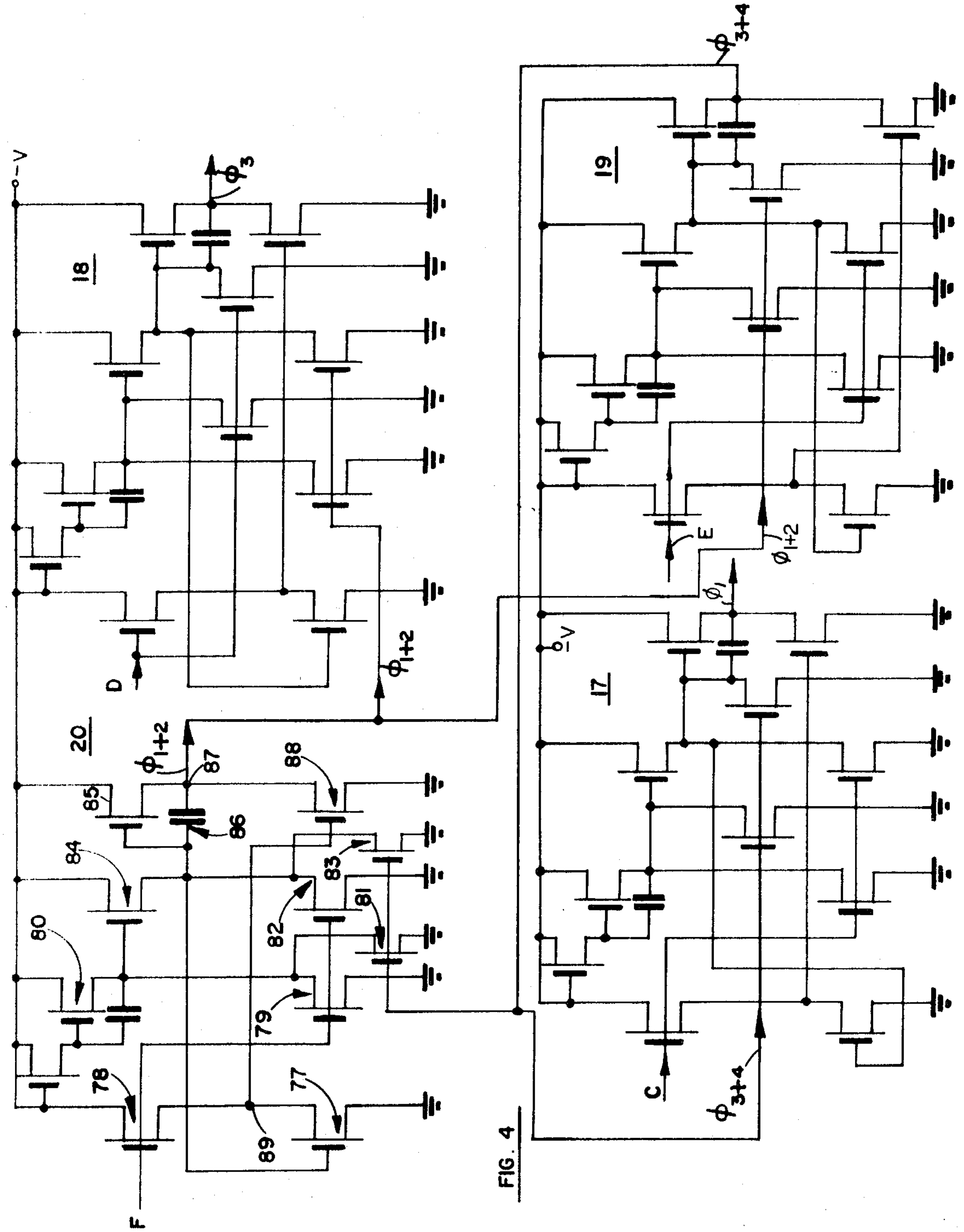
FIG. 4 is a schematic diagram of the output logic gates shown in FIG. 1 implemented by field effect transistors.

FIG. 4 is a schematic diagram of the output logic gates 4 shown in FIG. 1. For purposes of describing a preferred embodiment, the logic gates 4 are shown in the form of NOR gates. The NOR gates 17 through 20 are identical except for the application of different input signals for generating different output multiple phase clock signals. Since the circuitry is identical for each of the NOR gates, only NOR gate 20 will be described in detail.

NOR gate 20 comprises field effect transistor 78 connected in electrical series with field effect transistor 77 between −V and electrical ground. Signal F taken from point 62 shown in FIG. 3, is provided as an input signal to the gate electrode of field effect transistor 78. The F signal is also provided as an input to inverter field effect transistor 79 which is connected in electrical series with bootstrap circuit 80. The bootstrap circuit 80 is connected in series with inverter 79 between -V and electrical ground. The conduction path of field effect transistor 81 is connected in electrical parallel with the conduction path of inverter field effect transistor 79 The gate electrode of field effect transistor 81 is connected to and controlled by multiple phase clock signal $\phi_{3+4}$ taken from the output terminal of NOR gate 19. The F signal and the $\phi_{3+4}$ signal are also applied to the gate electrodes of inverter field effect transistors 82 and 83 respectively. The conduction paths of field effect transistors 82 and 83 are connected in electrical parallel with each other and are connected in electrical series with field effect transistor 84 between −V and electrical ground. Field effect transistor 88, in combination with field effect transistor 85, and capacitor 86 implement a bootstrap driver circuit for providing the output multiple phase clock signal $\phi_{1+2}$ at point 87. Inverter field effect transistor 88 is controlled by the signal level at point 89.

In operation, when signal F is true, field effect transistor 78, field effect transistor 79, and field effect transistor 82 are turned on. As a result, field effect transistor 88 is turned on and field effect transistors 77 and 85 are turned off. Therefore, regardless of the state of the $\phi_{3+4}$ signal, output terminal 87 is at electrical ground. As can be seen in FIG. 5, when the F signal 22 is true, the $\phi_{1+2}$ signal is false.

When the F signal becomes false (i.e. ground level), field effect transistor 78 is turned off as are field effect transistors 79 and 82. If the $\phi_{3+4}$ signal is true, however, field effect transistors 81 and 83 are turned on so that the output $\phi_{1+2}$ at circuit point 87 remains false. That is, circuit point or terminal 87 is connected to electrical ground via conductive field effect transistor 83. However as shown by the signals in FIG. 5, when the F signal is false, the $\phi_{3+4}$ signal is also false. Therefore, the field effect transistors 79, 81, 82 and 83 are turned off in addition to field effect transistor 78. AS a result, bootstrap circuit 80 provides a relatively high voltage (e.g., approximately −V). on the gate electrode of the field effect transistor 84. Field effect transistor 84 is turned on to provide a drive voltage approximately equal to −V on the gate electrode of field effect transistor 77. When field effect transistor 77 becomes conductive, point 89 is connected approximately to electrical ground and field effect transistor 88 is turned off. When field effect transistor 88 is turned off, point 87 is driven to approximately −V, the stored charge on the booster capacitor 86 causes the voltage on the gate electrode of field effect transistor 85 to go more negative than one threshold below −V whereby signal $\phi_{1+2}$ becomes true as shown in FIG. 5. Signal $\phi_{1+2}$ is thus provided as an output signal on circuit point 87(i.e., terminal 5 of the circuit of FIG. 1) and is also fedback as an input to NOR gate 18.

Under certain operating conditions, the field effect transistors 85 and 88 at the output of NOR gate 20 and corresponding field effect transistors at the outputs of the other NOR gates 17, 18, and 19 can both be on momentarily. Under such conditions, excessive current may be required. The condition normally occurs during a transition period. For example, if the F signal is false, the voltage at the gate electrodes of field effect transistors 85 and 77 is approximately −V and field effect transistor 78 is turned off. As a result, the voltage at the gate electrode of field effect transistor 88 is approximately ground so that the field effect transistor is turned off. Under those circumstances, signal $\phi_{1+2}$ is true, i.e., approximately −V.

If the F signal becomes true, field effect transistor 78 turns on and the voltage at the gate electrode of field effect transistor 88 is driven to approximately −V/2. The operation assumes that the field effect transistors 77 and 79 are both unit devices, before the charge stored on capacitor 86 at the gate electrode of field effect transistor 85 is discharged. As a result, the field effect transistors 85 and 88 are momentarily both on so that current is drawn from the supply voltage to electrical ground.

Obviously, such a condition is undesirable. The condition can be remedied by changing the size of transistors 78 and 77 so that field effect transistor 78 is four-thirds as wide as field effect transistor 77 in the embodying semicon-ductor substrate. As a result, if field effect transistor 78 is turned on while field effect transistor 77 is on, the voltage at the gate electrode of field effect transistor 85 drops below the threshold voltage of field effect transistor 77. At that time, and only then, does field effect transistor 88 become conductive. Consequently, field effect transistors 85 and 88 are not both on at the same time. The relationship between the input signals to the NOR gate and the multiple phase output signals produced thereby can be seen by referring to Table I. The feedback from certain of the output terminals to certain input terminals of the NOR gates provides a synchronized relationship between the various phases of the multiple phase output signals.

It is pointed out, that the description of the preferred embodiment utilizes electrical ground and −V as false and true levels respectively. Since negative voltages are described, it can also be assumed that P channel field effect transistors would be utilized.

However, other logic conventions and other types of field effect transistors could also be used in implementing other embodiments of the invention. In addition, although MOS devices can be used to implement the multiple phase clock signal generator, other field effect devices including MNOS devices, silicon gate devices, and the like can be used.

I claim:

1. A multiple phase clock signal generator comprising, an RC oscillator circuit generating multiple and phase related square save signals, a control circuit receiving said square wave signals including means for phase ordering said signals to prevent phase overlapping between the signals, a multi-bit shift register in which outputs from certain bit positions of the shift register are inverted and fed back as inputs to other bit positions of the shift register, said shift register being gated by the signals generated by said control circuit, and output logic gates generating multiphase clock signals in response to outputs from said shift register and in response to certain multiphase clock signals fed back from the outputs of said logic gates for providing a synchronized relationship between the multiphase clock signals being generated.

2. The multiple phase clock signal generator recited in claim 1 wherein said control circuit comprises logic gates having square wave output signals which are fed back to the inputs of different ones of the logic gates for ordering the phase relative to the square wave signals generated by the oscillator circuit.

3. A multiple phase clock signal generator recited in claim 2 wherein said control circuit further comprises two NOR gates receiving two square wave signals as inputs from said RC oscillator circuit, said NOR gates inverting the phase of the input square waves, the outputs from each NOR gate being fed back as an input to the other NOR gate for preventing phase overlapping between the phases of the square wave signals provided at the outputs of said NOR gates.

4. The multiphase clock signal generator recited in claim 1 wherein said multi-bit shift register has a plurality of bit positions determined as a function of the number of phases of said multiphase clock signals.

5. The multiphase clock signal generator recited in claim 2 wherein the RC time constant of said RC oscillator is selected for generating said square wave signals with a cycle equivalent to one phase of said multiphase clock signals.

6. The multiphase clock signal generator recited in claim 3 wherein said RC oscillator circuit, said multi-bit shift register, and said output logic gates, are implemented by field effect transistors.

7. The multiphase clock signal generator recited in claim 1 wherein said RC oscillator circuit includes first and second inverter circuits responsive to the charge and discharge voltage levels of the RC circuit for providing a first square wave output signal from said RC oscillator circuit, and a third inverter responsive to said first square wave output signal for providing a second square wave output signal having an opposite phase from said first signal, said control circuit including two NOR gates for phase inverting said first and second square wave signals, the second phase inverted square wave signal being applied to said multi-bit shift register for gating information into said multi-bit shift register, and said first phase inverted square wave signal being applied to said multi-bit shift register for gating information out of said shift register.

8. The multiphase clock signal generator recited in claim 7 wherein said multi-bit shift register comprises two bit positions, and said output logic gates comprise four logic gates for generating four multiphase clock signals.

9. The multiphase clock signal generator recited in claim 8 wherein said multi-bit shift register includes inverters for inverting the output from both bit positions of two bit shift register, and said output logic gates comprise four NOR gates responsive to the output signals from both bit positions of said shift register and to the inverted outputs from said bit positions, and responsive to signals fed back from the outputs of said NOR gates for generating four phase related clock signals comprising said multiphase clock signals, said NOR gates including output stages comprising field effect transistors having a size relative to each other for preventing both field effect transistors from being on simultaneously.

10. The multiphase clock signal generator recited in claim 9 wherein two of said multiphase clock signals have a clock signal width which is twice as large as the clock signal width of the remaining two clock signals.

11. A multiple phase clock signal generating circuit comprising, oscillator circuit means for supplying regularly recurring signals, control circuit means connected to said oscillator circuit for receiving signals therefrom and producing output signals which are a function of the inverted signals from said oscillator circuit, shift register means for receiving signals from said control circuit means wherein said signals from said control circuit means control the operation of said shift register means, and output means including a plurality of gate means, each of said gate means having a plurality of input terminals and an output terminal, at least one of said input terminals of each of said gate means connected to said shift register means to receive signals therefrom, the output terminals of some of said gate means connected to the other input terminals of said gate means whereby said output means produces output signals representative of the signals received from said shift register means.

* * * * *